United States Patent [19]
Yonemochi et al.

[11] Patent Number: 6,081,828
[45] Date of Patent: Jun. 27, 2000

[54] COMPUTER SYSTEM, AND HOST COMPUTER AND PORTABLE TERMINAL SUITABLE FOR THE SYSTEM

[75] Inventors: Yasuhiro Yonemochi, Osaka; Hiroshi Masuno, Tokyo, both of Japan

[73] Assignee: NEC Corporation, Japan

[21] Appl. No.: 08/987,953

[22] Filed: Dec. 10, 1997

[30] Foreign Application Priority Data

Dec. 10, 1996 [JP] Japan .................................. 8-346707

[51] Int. Cl.$^7$ ............................................ G06F 15/16
[52] U.S. Cl. ........................................ 709/200; 709/204
[58] Field of Search ................................ 709/200, 204, 709/206, 217, 203, 205; 340/825.5, 825.17

[56] References Cited

U.S. PATENT DOCUMENTS

| | | | |
|---|---|---|---|
| 4,812,840 | 3/1989 | Girard | 340/825.5 |
| 5,062,059 | 10/1991 | Youngblood et al. | 709/217 |
| 5,245,603 | 9/1993 | Newman | 340/825.5 |
| 5,426,594 | 6/1995 | Wright et al. | 709/206 |
| 5,530,893 | 6/1996 | Sugi | 340/825.5 |
| 5,568,645 | 10/1996 | Morris et al. | 709/203 |
| 5,608,872 | 3/1997 | Schwartz et al. | 709/205 |
| 5,649,104 | 7/1997 | Carleton et al. | 709/204 |
| 5,717,856 | 2/1998 | Carleton et al. | 709/204 |
| 5,761,419 | 6/1998 | Schwartz et al. | 709/204 |
| 5,793,967 | 8/1998 | Simciak et al. | 709/204 |

*Primary Examiner*—Mark H. Rinehart
*Assistant Examiner*—Marc D. Thompson
*Attorney, Agent, or Firm*—Ostrolenk, Faber, Gerb & Soffen, LLP

[57] ABSTRACT

There is provided a computer system which enables a portable terminal to be made smaller, lighter and less expensive, in which the portable terminal can share data with a host computer such as a personal computer installed in an office or the like so that data management can be centralized, and as long as any stand-alone application software is installed in the host computer, it can use the application software freely at any time. The computer system comprises a host computer incorporating therein stand-alone application software, and a portable terminal coupled to the host computer through a communication medium, the host computer including host-side input control means capable of switching over between a host-side input device and a host-side communication device for use as an input data source supplying input data to the application software, and processing result fetching means for fetching output data resulting from the processing by the application software and sent to a host-side output device and sending it to the host-side communication device.

26 Claims, 9 Drawing Sheets

COMPUTER SYSTEM, AND HOST COMPUTER AND PORTABLE TERMINAL SUITABLE FOR THE SYSTEM

BACKGROUND OF THE INVENTION

1. Field of the Invention

This invention relates to a computer system of which remote operation is enabled. For example, it relates to a computer system suitable for remotely operating a desk-top multimedia computer from a portable terminal by means of communication.

2. Related Background Art

Recent popularization of office automation has rapidly broadened the use of computers in business environments, where various application software such as word processing and data base has been used for improvement of paperwork efficiency not only at offices but also on business trips or at user's destinations.

For such uses, portable personal computers having high level functions, generally called notebook or sub-notebook computers, have been used in the conventional cases. Since the same application software as installed in desk-top personal computers for offices is installed in such portable personal computers, the user can do his paperwork on a business trip or at his destination in the same manner as he do at his office.

When the consistency of data is required between the desk-top office computer and the portable personal computer used at user's destination, the data is usually copied from one computer to another through a portable recording medium such as a floppy disk or magneto-optical disk.

On the other hand, in advanced offices where each personal computer is connected to a server through a LAN, the user can use the portable personal computer at his destination to access to the in-house server through communication software, such as called remote office or the like, for downloading desired data. The data can thus be shared between the in-house server and the portable personal computer to secure the consistency of the data.

Recent tendencies to allow high level functions of such application software and develop graphic interfaces of OSs, however, require notebook or sub-notebook type portable personal computers supporting them to increase in the capacity of their hard disks and semiconductor RAMs and improve performance of their CPUs. Since such requirements cause an increase in power consumption and hence an increase in the capacity of their batteries, the portability of the notebook or sub-notebook type personal computers are made much worse and each battery life becomes relatively shorter. Besides, it goes against the tendency to require the cost efficiency.

In the computer system where data is copied from one computer to another through a portable recording medium to secure the consistency of the data between both computers, a copy error or improper copying cycle may often occur. On the other hand, with the computer system where each personal computer is connected to an in-house server through an in-house LAN so that the user can directly access to the in-house server and share data with the server at his destination, it is difficult for small offices having one or a few personal computers at most to introduce such an improved system because too much expenses are required.

SUMMARY OF THE INVENTION

The present invention has been made to solve the above conventional problems, and an object thereof is to provide a computer system which enables a portable terminal to be made smaller, lighter and more inexpensive, in which the portable terminal can share data with a host computer such as a personal computer installed in an office or the like so that data management can be centralized, and as long as any stand-alone application software is installed in the host computer, it can use the application software freely at any time.

In a first feature of the present invention, there is provided a computer system comprising a host computer incorporating therein stand-alone application software, and a portable terminal coupled to the host computer by means of communication, the host computer including
- a host-side communication device for communicating with the portable terminal,
- a host-side input device for generating input data necessary for processing by the application software,
- a host-side output device for providing output operation in accordance with output data resulting from the processing by the application software,
- host-side input control means capable of switching over between the host-side input device and the host-side communication device for use as an input data source supplying input data to the application software, and
- processing result fetching means for fetching the output data resulting from the processing by the application software and sent to the host-side output device and sending it to the host-side communication device, and the portable terminal including
- a terminal-side communication device for communicating with the host computer,
- a terminal-side input device for generating input data necessary for processing by the application software,
- a terminal-side output device for providing output operation in accordance with output data resulting from the processing by the application software,
- terminal-side input control means for sending the input data, generated by the terminal-side input device, to the terminal-side communication device, and
- output reproducing means for reproducing output data from the output received by the terminal-side communication device and sending it to the terminal-side output device,
- whereby the processing by the stand-alone application software is executed in the host computer in response to the input data transmitted from the portable terminal, and the output device of the portable terminal is started in response to the resultant output data returned from the host computer.

The term "stand-alone application software" denotes application software installed in a computer, which is designed to receive input data from an input device of the computer and send resultant output data to an output device of the computer.

According to the first feature of the present invention, the processing by the stand-alone application software is executed in the host computer in response to the input data transmitted from the portable terminal, and the output device of the portable terminal is started in response to the resultant output data returned from the host computer, whereby the portable terminal can be made smaller, lighter and more inexpensive, which can share data with the host computer such as a personal computer installed at an office or the like so that data management can be centralized, and as long as any stand-alone application software is installed in the host computer, which can use the application software freely at any time.

In a second feature of the present invention, there is provided a host computer comprising:

a host-side communication device for communicating with portable terminals;

a host-side input device for generating input data necessary for processing by stand-alone application software installed in the host computer;

a host-side output device for providing output operation in accordance with output data resulting from the processing by the application software;

host-side input control means capable of switching over between the host-side input device and the host-side communication device for use as an input data source supplying input data to the application software; and processing result fetching means for fetching the output data resulting from the processing by the application software and sent to the host-side output device and sending it to the host-side communication device.

In a third feature of the present invention, there is provided a portable terminal comprising:

a terminal-side communication device for communicating with a host computer;

a terminal-side input device for generating input data necessary for processing by stand-alone application software installed in the host computer;

a terminal-side output device for providing output operation in accordance with output data resulting from the processing by the application software;

terminal-side input control means for sending the input data, generated by the terminal-side input device, to the terminal-side communication device;

output reproducing means for reproducing output data from the output received by the terminal-side communication device and sending it to the terminal-side output device; and communication means for communicating with the host computer.

In a fourth feature of the present invention, there is provided a recording medium storing a program therein, the program allowing a computer to function as:

host-side input control means for switching over between a host-side input device and a host-side communication device for use as an input data source supplying input data to stand-alone application software; and processing result fetching means for fetching output data resulting from the processing by the stand-alone application software and sent to a host-side output device and sending it to a host-side communication device.

BRIEF DESCRIPTION OF THE DRAWINGS

The above and other objects and advantages and further description will now be discussed in connection with the drawings, in which.

DETAILED DESCRIPTION OF THE PREFERRED EMBODIMENTS

Referring to the accompanying drawings, preferred embodiments of the present invention will be described in detail below.

Figure 1:
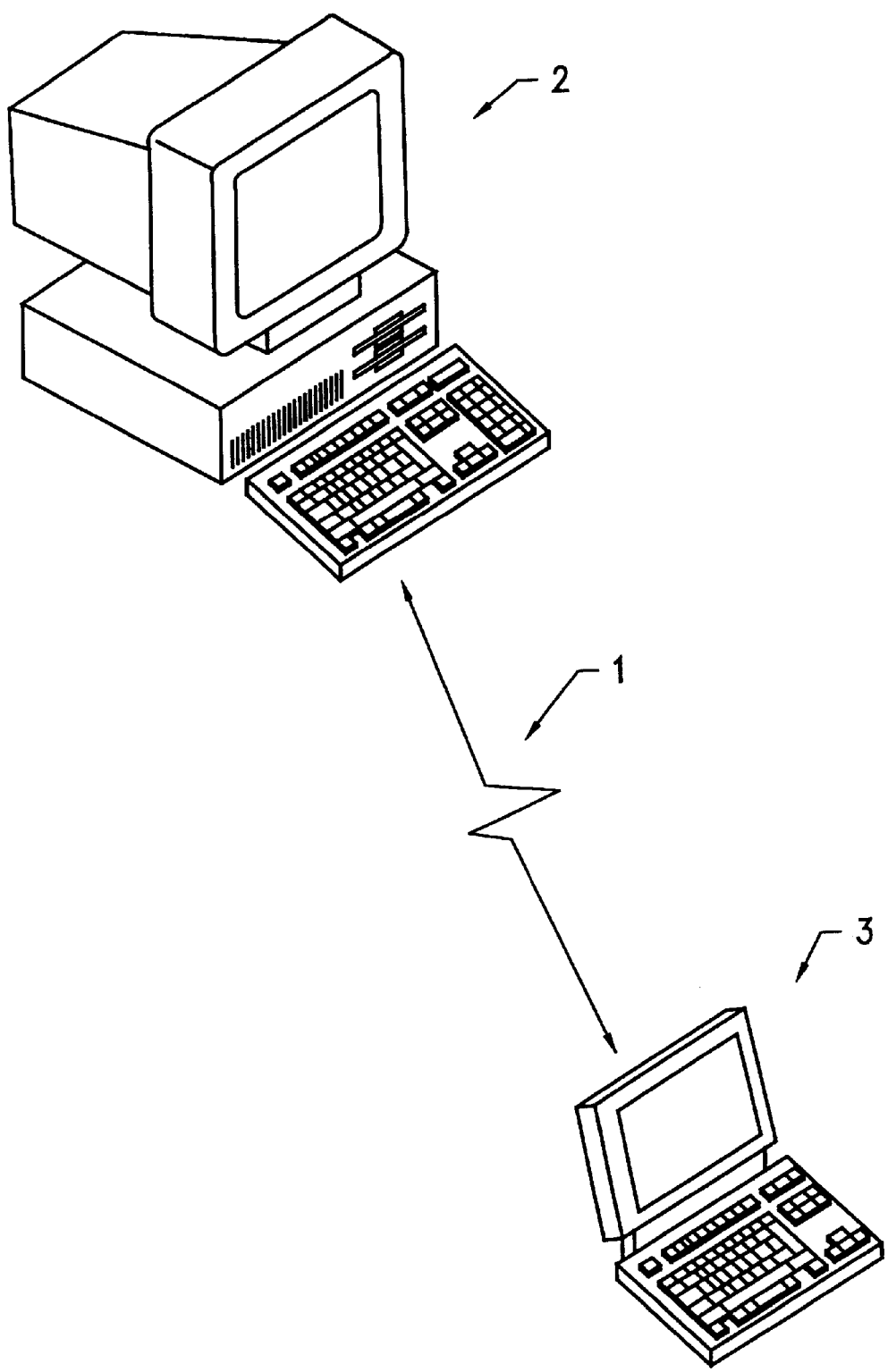
FIG. 1 is a perspective view showing exemplary externals of a host computer and a portable terminal constituting a computer system according to the present invention.

FIG. 1 is a perspective view showing exemplary external views of a host computer and a portable terminal in a computer system according to the present invention. It should be noted here that the external views of the host computer and the portable terminal of the present invention are not limited to that which is shown in FIG. 1.

As shown in the drawing, a computer system according to the embodiment is constructed of a host computer 2 incorporating therein stand-alone application software and a portable terminal 3 coupled to the host computer 2 through a communication medium 1.

In this example, the host computer 2 shown is a desk-top multimedia personal computer, which may be fixedly installed in an office or at home. As is well known in the art, such a personal computer generally includes a computer body, an input device or devices such as a keyboard and a mouse, an output device or devices such as a CRT display, a laser printer and speakers, and a modem for connection to a communication line. The desk-top personal computer constituting the host computer 2 is capable of incorporating therein stand-alone application software that processes multimedia data by itself. The term "stand-alone application software" denotes application software programmed to execute various processes based on input data from an input device of its computer and send resultant output data to an output device of its computer.

In this example, the portable terminal 3 is a small and light personal computer of about A5 size (148×210 mm), exclusively used for a terminal, which includes a relatively low-function CPU. Such a terminal is easy to carry on a business trip or in a business field. The portable terminal 3 includes an input device or devices such as a keyboard or touch panel, an output device such as a liquid crystal monochromatic or color image display device, and a communication device such as a modem for connection to a communication line, e.g., to PHS data communications network. The portable terminal 3 is also provided with serial or parallel ports for connection to other output devices such as an external printer and a headphone or other input devices such as a mouse and a scanner.

Although the portable terminal 3 allows various functions to be carried out, it does not need mass-storage hard disk and semiconductor RAM, a high-speed, high-function microprocessor, and a large-capacity battery. As will be described later, the portable terminal 3 is mainly used for control of I/O and communication functions alone, while the host computer has charge of execution of the processing by the application software requiring a mass storage device and a high-function CPU.

Figure 2:
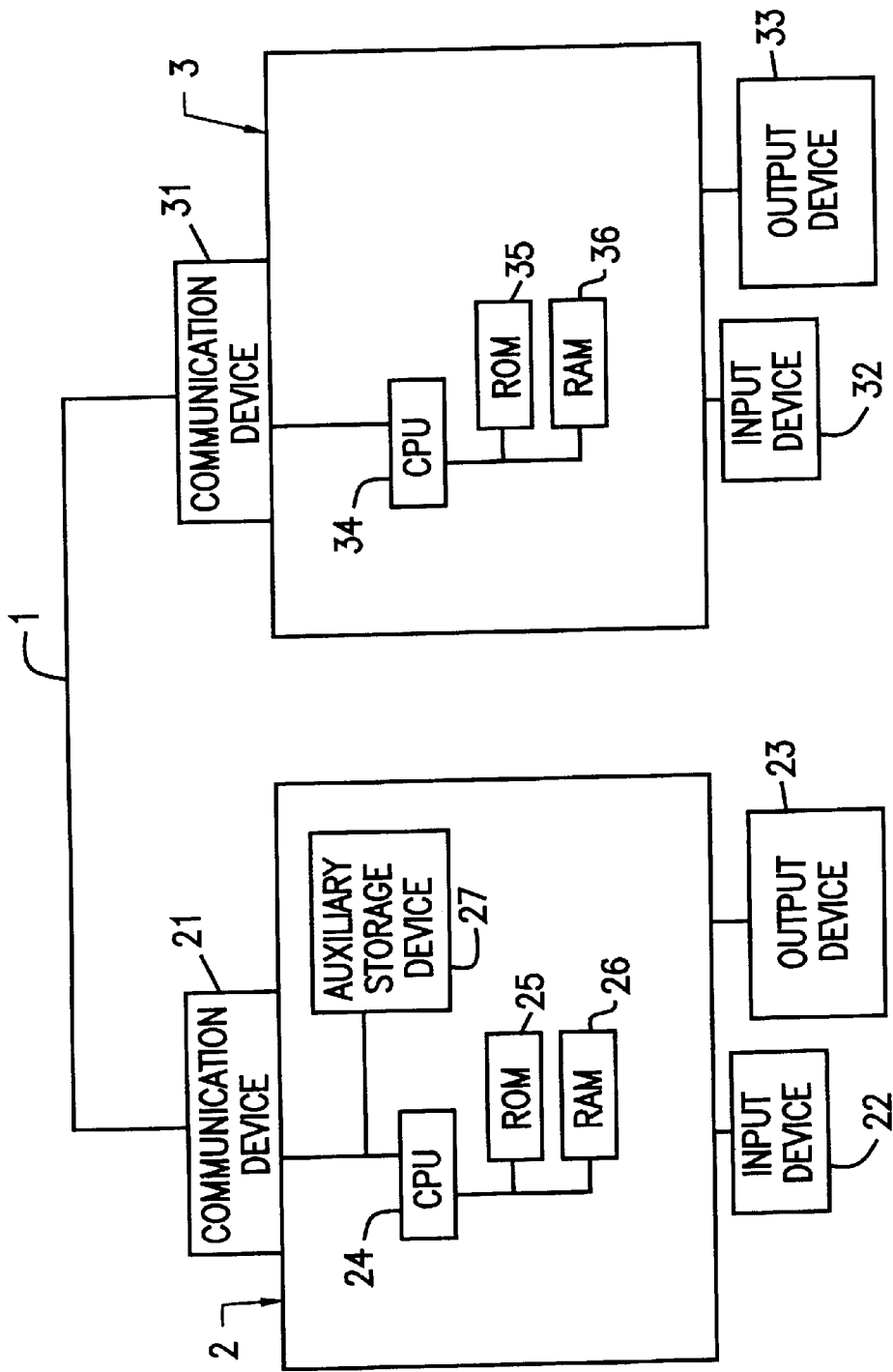
FIG. 2 is a block diagram showing an example of electrical hardware configuration of the host computer and the portable terminal constituting the computer system according to the present invention.

FIG. 2 is a block diagram showing an example of electrical hardware configuration of the host computer 2 and the portable terminal 3 constituting the computer system according to the present invention.

As shown in the drawing, a communication device 21 of the host computer 2 and a communication device 31 of the portable terminal 3 are connected via the communication medium 1. As the communication medium 1, public telephone network, radio wave, infrared ray, digital radio communication network, PHS data communication network, ISDN network and LAN can be cited. The structure of the host-side communication device 21 and the terminal-side communication device 31 is determined depending on the structure of the communication medium 1 used, and various structure is possible such as a combination of a modem and a telephone, a combination of a digital cellular card and a digital portable telephone and a combination of an infrared LED and an infrared sensor.

As discussed above, the host computer 2 may be a high-function computer such as a desk-top multimedia personal computer. A CPU 24 in the host computer 2 is a high-speed, high-function microprocessor for generally controlling all the devices. A ROM 25 is used as a storage area for various fixed data, which may be a semiconductor memory. A RAM 26 is used as a work area for reading and executing the application software, which particularly tends to be a mass-storage semiconductor memory due to recently widespread image and multitask processes. An auxiliary storage device 27 is used as a storage area for various application software (including the stand-alone application software of the present invention) and the OS, which also tends to be a mass-storage device such as a mass-storage hard disk. An input device 22 may be constructed of a keyboard and a mouse. An output device 23 may be constructed of a CRT display, a printer and a headphone. The CPU 24 thus executes a program read out in the RAM 26 and allows various functions of the present invention to be carried out.

As discussed above, the portable terminal 3 may be a small and light personal computer of about A5 size, exclusively used for a terminal, which builds in a relatively low-function CPU. In other words, an inexpensive microprocessor that carries out low level functions at relatively low speed can be used as a CPU 34 for generally controlling the entire terminal and all the associated devices. A ROM 35 is for storing programs for carrying out various functions necessary for the terminal, which may be a semiconductor memory. A RAM 36 is used as a work area when the CPU 34 executes a program stored in the ROM 35. As an input device 32, a keyboard, a touch pen, a pen, a joy stick, a track ball and a communication receiver for a navigation system (GPS) can be used. As an output device 33, a liquid crystal display, a printer and a headphone can be cited. The CPU 34 thus executes a program read out in the RAM 36 and allows various functions necessary for the terminal to be carried out.

Figure 3:
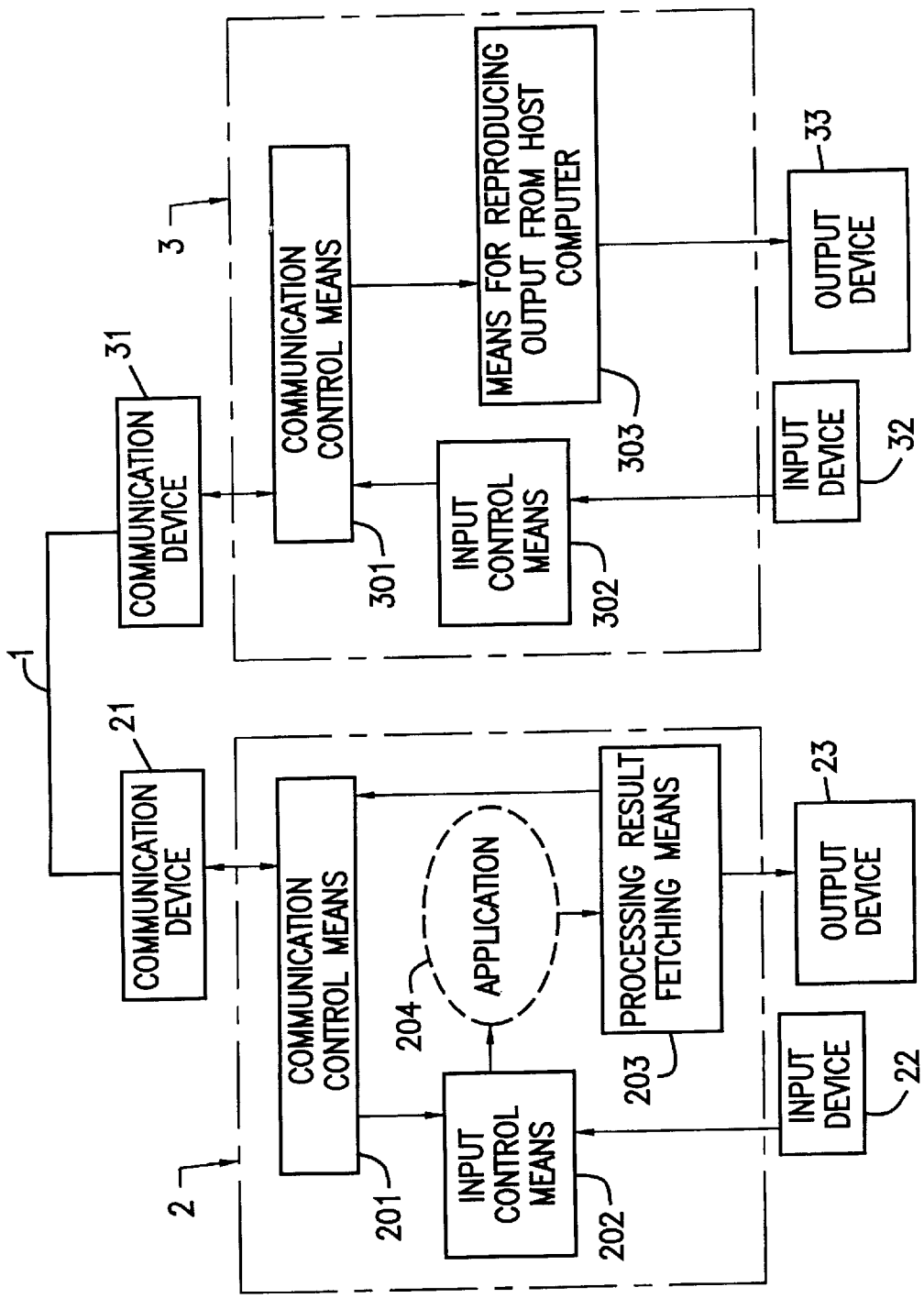
FIG. 3 is a block diagram showing an example of functional structure of the host computer and the portable terminal constituting the computer system according to the present invention.

FIG. 3 is a block diagram showing an example of functional structure of the host computer and the portable terminal constituting the computer system according to the present invention.

As shown in the drawing, the computer system according to the present invention is constructed of the host computer 2 incorporating therein stand-alone application software 204 and the portable terminal 3 coupled to the host computer 2 through a communication medium 1.

The host computer 2 includes the host-side communication device 21 for communicating with the portable terminal 3; the host-side input device 22 for generating input data necessary for processing by the application software 204; the host-side output device 23 for providing output operation in accordance with output data resulting from the processing by the application software 204; host-side input control means 201 capable of switching over between the host-side input device 23 and the host-side communication device 21 for use as an input data source supplying input data to the application software 204; and processing result fetching means 203 for fetching output data resulting from the processing by the application software 204 and sent to the host-side output device 23, and sending it to the host-side communication device 21.

The portable terminal 3 includes the terminal-side communication device 31 for communicating with the host computer 2; the terminal-side input device 32 for generating input data necessary for processing by the application software 204; the terminal-side output device 33 for providing output operation in accordance with output data resulting from the processing by the application software 204; terminal-side input control means 302 for sending the input data, generated by the terminal-side input device 32, to the terminal-side communication device 31; and output reproducing means 303 for reproducing output data from the output received by the terminal-side communication device 31 and sending it to the terminal-side output device 33.

In such structure, when input operation is carried out through the terminal-side input device 32, the input control means 302 transfers generated input data to communication control means 301. The input data transferred from the input control means 302 is then transmitted from the communication device 31 to the host computer 2 via the communication medium 1 through the communication control means 301.

The format of the input data generated by the input device 32 of the terminal 3 and transmitted to the host computer 2 must be the same as that of input data generated by the input device 22 of the host computer 2, or else the application software 204 cannot process both input data equivalently.

If the format of input data generated by the terminal-side input device 32 differs from that generated by the host-side input device 22, the input control means 302 should be provided with an equalizing function for making the formats of both input data correspondent to each other.

Figure 4:
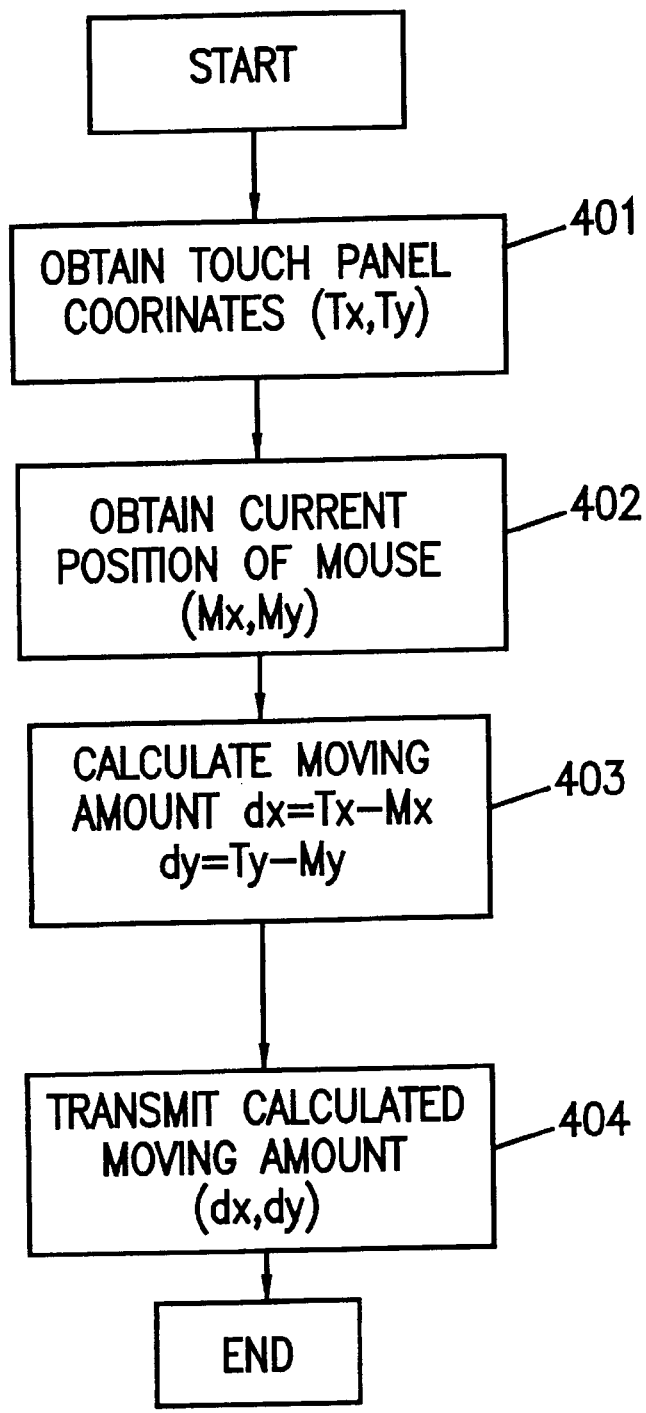
FIG. 4 is a flowchart showing a software program that allows functions of terminal-side input control means to be carried out.

FIG. 4 is a flowchart showing an example of processing by software for carrying out the equalizing function to be provided with the input control means 302 when the terminal-side input device 32 is a touch panel for supplying input data in the form of coordinates (absolute value) and the host-side input device 22 is a mouse for supplying input data in the form of a moving amount (relative value).

In the drawing, when the processing is started, touch panel coordinates (Tx, Ty) are obtained from the touch panel that is part of the input device 32 (step 401), and mouse coordinates (Mx, My) indicative of the current mouse position are obtained through the communication control means 301 (step 402). After that, the difference between both coordinates is calculated to convert the touch panel coordinates (Tx, Ty) into a moving amount (dx, dy) (step 403), and the moving amount (dx, dy) obtained is transmitted to the host side (step 404).

If the host-side input device 22 and the terminal-side input device 32 have the same structure, the equalizing function, of course, will not need to be provided in the input control means 302. Similarly, when a communication satellite receiver (GPS) for a navigation system is used as the terminal-side input device 32 and data is input from its serial port, the equalizing function does not need to be provided in the input control means 302.

Although the input control means 202 is normally operative to transfer input data from the host-side input device 22 to the application software 204, when terminal-side input data arrives at the input control means 202 through the communication control means 201, it transfers the terminal-side input data to the application software 204 instead of the input data from the host-side input device 22. The stand-alone application software 204 incorporated in the host computer 2 is thus allowed to be operated from the portable terminal 3.

After that, the application software 204 executes predetermined processing according to the input data, and output data resulting from the processing is given to the host-side output device 23. The printer or CRT display constituting the host-side output device 23 thus provides output operation in accordance with the output data. The output data resulting from the processing by the application software 204 is simultaneously fetched through the processing result fetching means 203 and transmitted to the terminal side through the communication control means 201.

Figure 5:
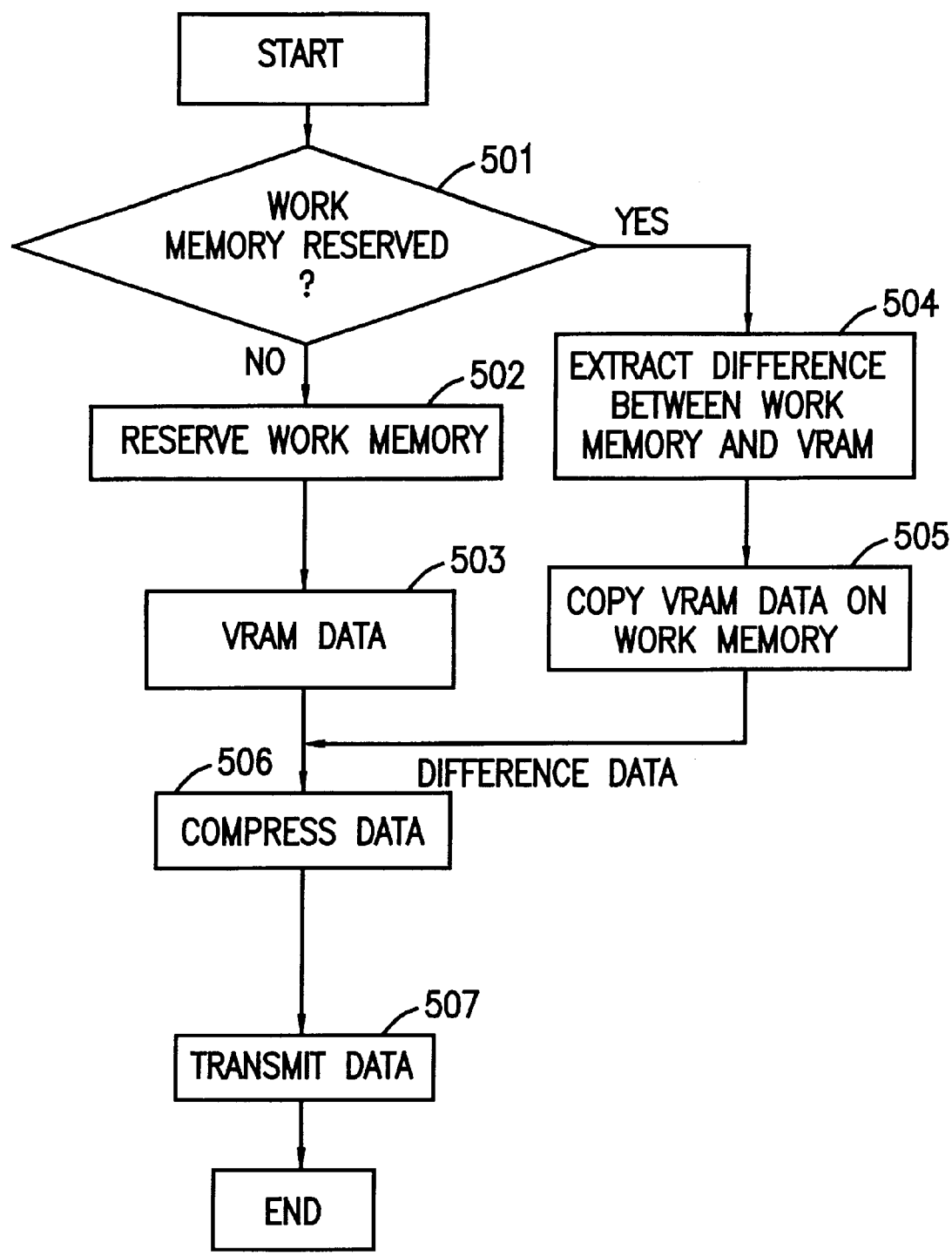
FIG. 5 is a flowchart showing a software program that allows an image-data processing function of processing result fetching means to be carried out.

FIG. 5 is a flowchart showing an example of software processes for carrying out functions required of the processing result fetching means 203 when the output data resulting from the processing by application software 204 is screen display data. The software for executing the process shown in FIG. 5 is operated independently of the application software 204 by means of a timer interrupt or the like.

As is well known in the art, if the output data resulting from processing by the application software 204 is screen display data, it is written into a video RAM (hereinbelow, referred to as VRAM), read by means of a CRT controller in order of scanning and displayed on the CRT display in FIG. 5, when processing is started, a work area is first reserved for fetching the screen display data (step 502 after no answer is obtained at step 501), and the screen display data in the VRAM (corresponding to output data of the application software) is then copied into the work area (step 503) After that, the screen display data copied in the work area is compressed by any one of known techniques (step 506) and transmitted to the terminal side through the communication control means 201 (step 507). In the subsequent execution cycles, the processing steps of extracting a difference between the screen display data in the work area and the screen display data in the VRAM (step 504), updating the contents of the work area based on those of the VRAM (step 505), compressing only differential data (step 506) and transmitting compressed data to the terminal side (step 507) are repeated.

In the above processes, difference extracting step (step 504) and data compressing step (step 506) are executed to reduce the amount of output data to be transmitted from the host computer 2 to the portable terminal 3 so that the I/O response speed of the terminal can be improved. Of course, the technique for reducing the amount of data is not limited to the above example.

Figure 6:
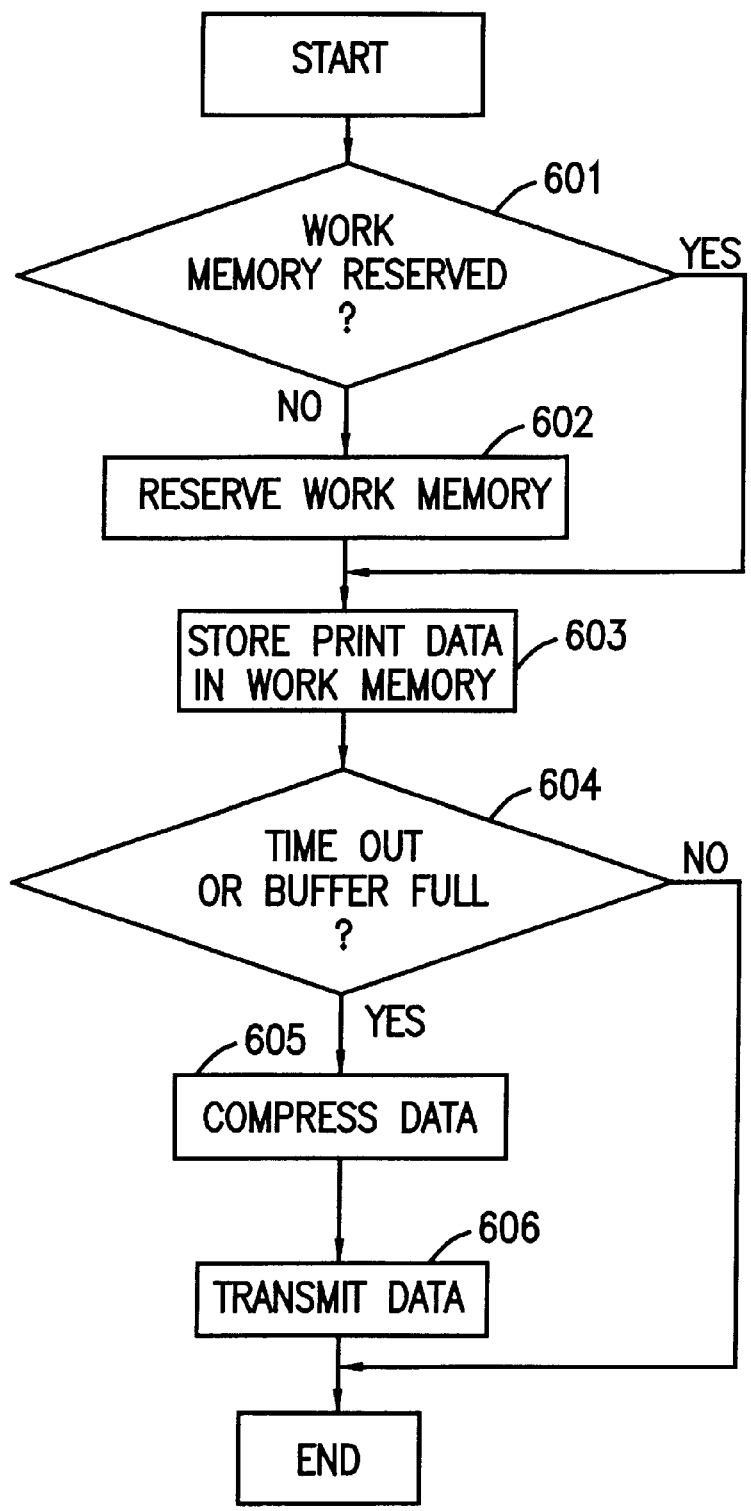
FIG. 6 is a flowchart showing a software program that allows a print-data processing function of the processing result fetching means to be carried out.

FIG. 6 is a flowchart showing an example of software processes for carrying out functions required of the processing result fetching means 203 when the output data resulting from the processing by the application software 204 is print data. The processing shown in FIG. 6 is started when the print data is output from the application software 204 by a technique such as called I/O trap or hook.

As is well known in the art, if the output data resulting from the processing by the application software 204 is print data, currently executed processing is changed to the processing of FIG. 6 by means of an I/O trap or hook instead of normal operation in which the print data is output to an I/O such as a printer port. In FIG. 6, when the processing is started in response to output of the print data, a work area functioning as a printer buffer for storing a fixed amount of print data is first reserved (step 602 after no answer is obtained at step 601), and print data resulting from the processing by the application software 204 is then stored, by means of the I/O trap or hook, in the work area previously reserved (step 603). After that, the processing step of storing the print data is repeated each time the output timing of print data comes (step 603 after yes answer is obtained at step 601). During the repetition of the processing, when the specified monitoring time has elapsed or the printer buffer becomes full (when yes answer is obtained at step 604), the print data stored in the work area is read and compressed (step 605), and transferred to the communication control means 201 for transmission to the portable terminal 3 (step 606).

Figure 7:
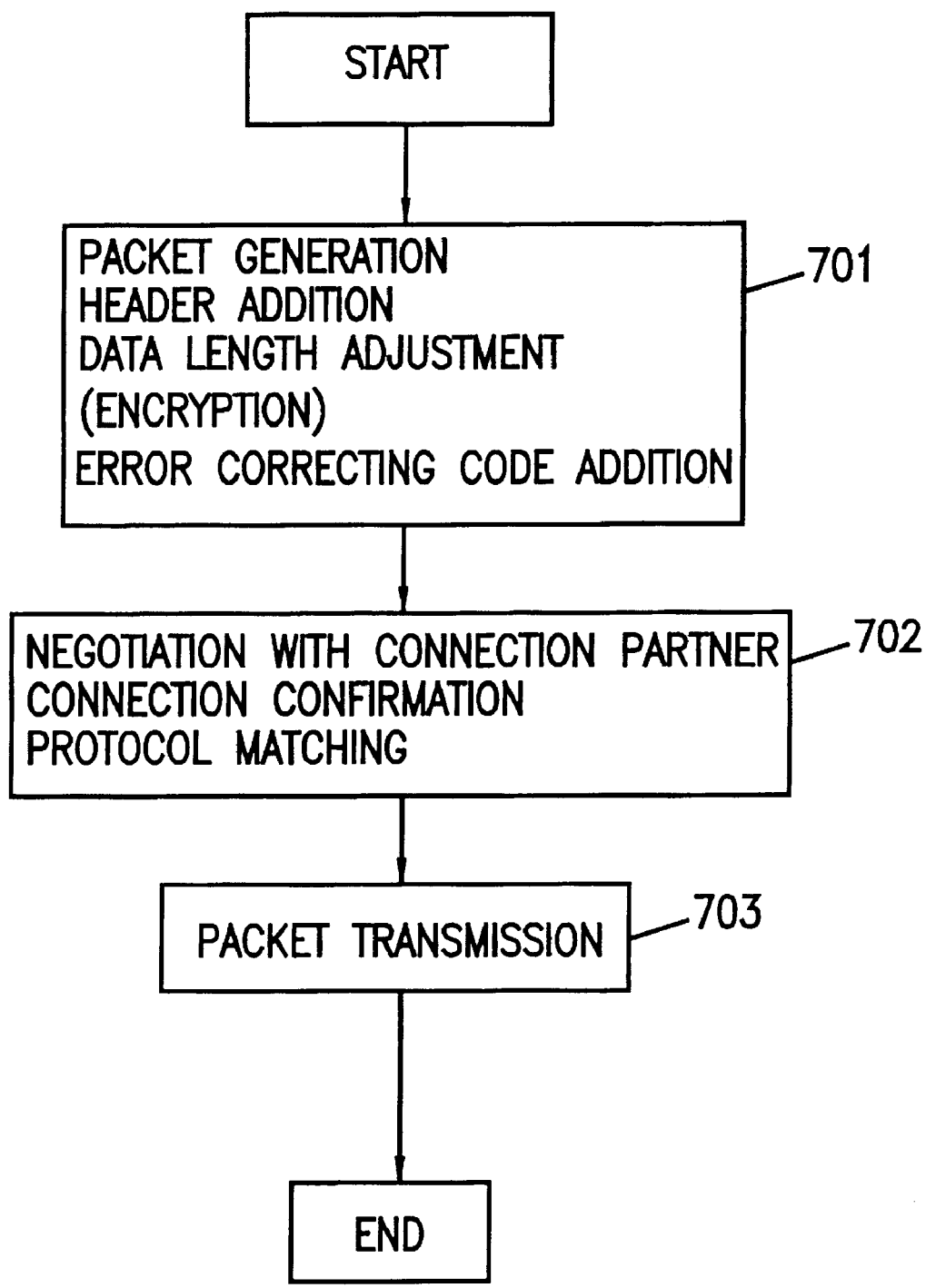
FIG. 7 is a flowchart showing a software program that allows functions of host-side communication control means to be carried out.

FIG. 7 is a flowchart showing an example of software processes for carrying out a transmission function of the host-side communication control means 201. The communication control means 201 may be started by a command from the processing result fetching means 203.

In the drawing, when the processing is started, packet generation is first performed, and after compressed data are batched according to the protocol, a header indicative of the type of data processed is added, the data length is adjusted, a transmission error correcting code is added, and encryption is performed as required (step 701). Then, the process steps of negotiating with the portable terminal for establishing a connection thereto, confirming the connection and establishing matched protocols (communication methods) are executed (step 702). The packet previously generated is finally transmitted (step 703).

Figure 8:
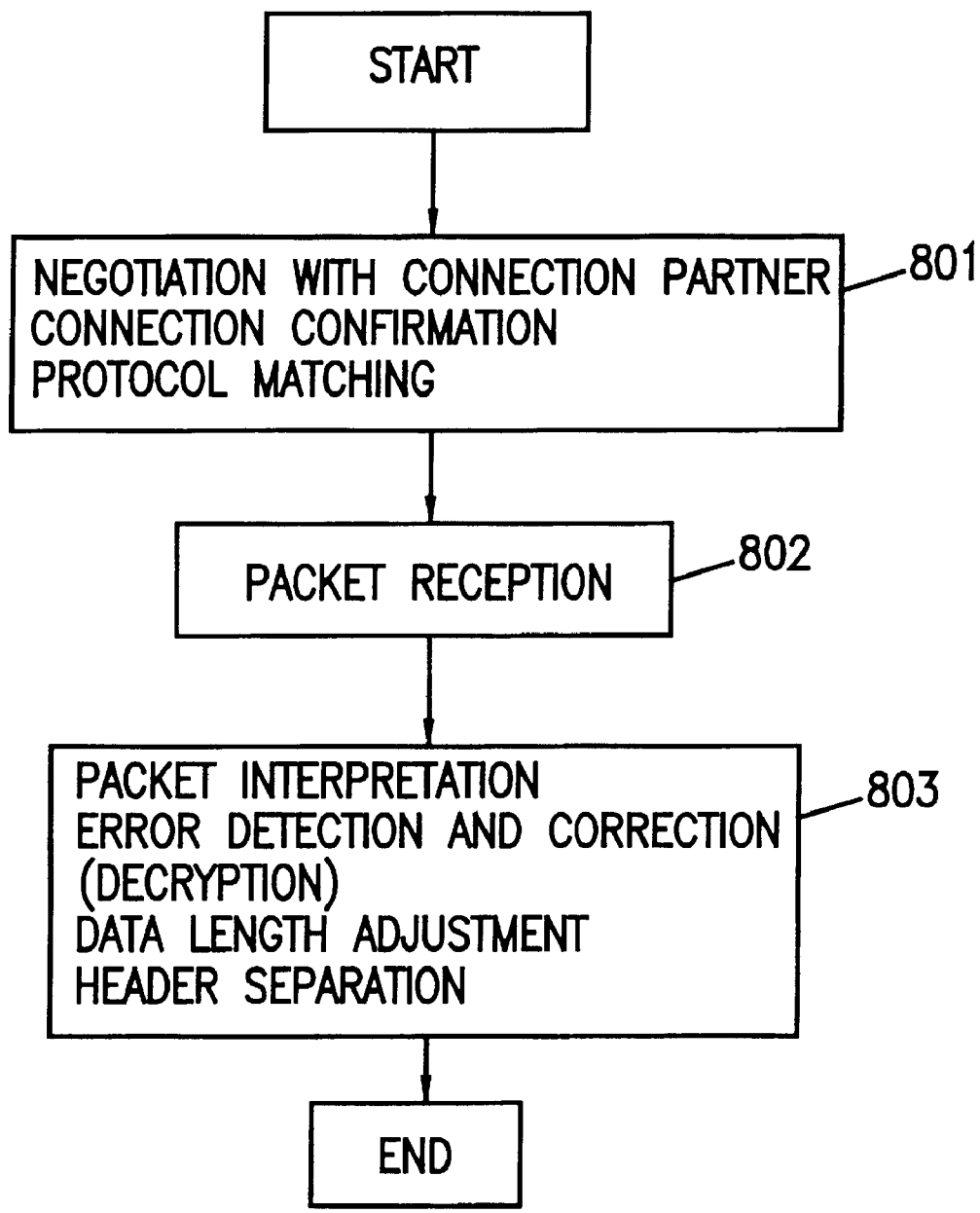
FIG. 8 is a flowchart showing software program that allows functions of terminal-side communication control means to be carried out.

FIG. 8 is a flowchart showing an example of software processes for carrying out a receiving function of the terminal-side communication control means 301.

In the drawing, when processing is started, the process steps of negotiating with the host computer 2 for establishing a connection thereto, confirming the connection and establishing matched protocols (communication methods) other are first executed (step 801). Then, the packet sent from the computer side according to its protocol is received (step 802). The packet received is finally interpreted. To restore original data, error detection and correction, decryption, data length adjustment and header separation are performed (step 803).

Figure 9:
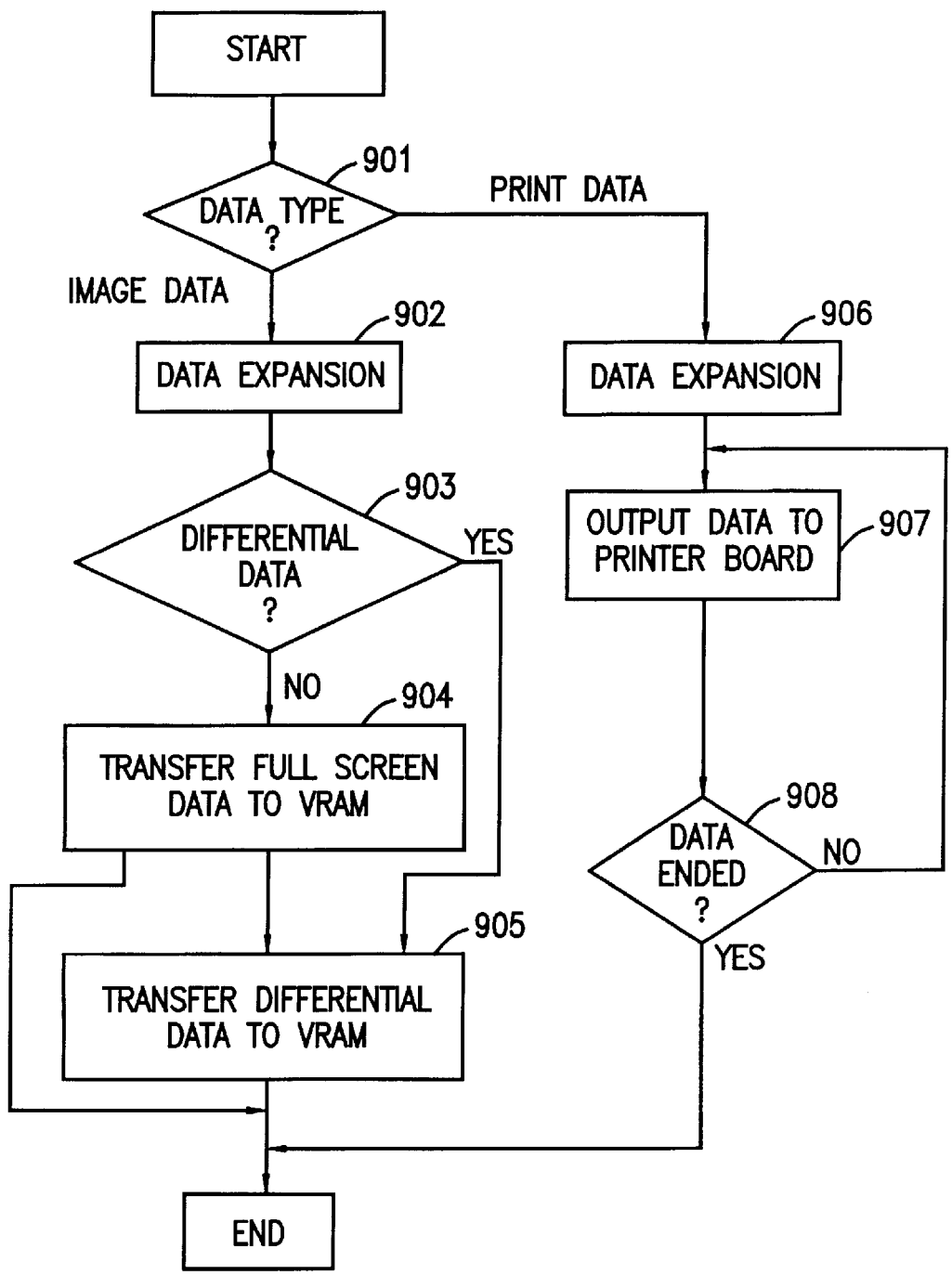
FIG. 9 is a flowchart showing a software program that allows functions of output reproducing means to be carried out.

FIG. 9 is a flowchart showing an example of software processes for carrying out functions of the output reproducing means 303. Upon receipt of output from the communication control means 301, the output reproducing means 303 transfers data to an output device corresponding to the data type.

In the drawing, when processing is started, the type of data received is judged (step 901). If judged to be screen display data (step 901), the received data is processed using a compression-expansion (data expansion) process unique to screen display data (step 902), and judgment is made on whether the data expanded is differential data or full screen data (step 903). If the expanded data is judged to be differential data (when yes answer is obtained at step 903), the VRAM is partially updated on the basis of the expanded data (step 905). If judged to be full screen data (when no answer is obtained at step 903), the VRAM is completely updated on the basis of the expanded data (step 904). On the other hand, if judged to be printer data (step 901), the received data is processed using a compression-expansion process unique to printer data (step 906), and the data expanded is output to a printer board provided in the portable terminal 3 (step 907) until the data output is ended (until no answer is obtained at step 908)

Although the flowchart of FIG. 9 shows only the case where the received data is either screen display data or printer data, the same process will be executed even if the received data is file data or sound data.

According to the computer system of the present invention, the stand-alone application software incorporated in the host computer can be operated from the portable terminal, so that a variety of convenient systems are possible. Specifically, a dictionary may be incorporated in the host computer for use on the portable terminal, a network may be connected to the host computer for use by the portable terminal, or a FAX modem may be connected to the host computer for facsimile transmission from the portable terminal.

The present invention features that the output data resulting from the processing by the stand-alone application software is screen display data to be written into a video RAM, and the terminal-side output device is an image display device.

According to this feature of the present invention, since the output data received by the portable terminal is screen display data for the video RAM that can be supplied in the display process immediately as it is, a high-function CPU is not needed in the portable terminal in which the display processing is executed. For this reason, the portable terminal can be made much smaller, lighter and less expensive.

The present invention also features that the output data resulting from processing by the stand-alone application software is print data to be written into a printer buffer, and the terminal-side output device is a printer.

According to this feature of the present invention, since the output data received by the portable terminal is print data for the printer buffer that can be supplied in the print process immediately as it is, a high-function CPU is not needed by the portable terminal in which the print processing is executed. For this reason, the portable terminal can be made much smaller, lighter and less expensive.

Further, the present invention features that the output data resulting from processing by the stand-alone application software is screen display data to be written into a video RAM, and the screen display data is compressed before transmission to the portable terminal and expanded after receipt by the portable terminal.

According to this feature of the present invention, the screen response speed of the portable terminal can be improved due to high-speed transmission.

Furthermore, the present invention features that the output data resulting from processing by the stand-alone application software is print data to be written into a printer buffer, and the print data is compressed before transmission to the portable terminal and expanded after receipt by the portable terminal.

According to this feature of the present invention, the printer response speed of the portable terminal can be improved due to high-speed transmission.

Furthermore, the present invention features that host-side input device is a relative-value input device such as a mouse, the terminal-side input device is an absolute-value input device such as a touch panel, and the input data from the portable terminal is converted from an absolute value to a relative value before input to the stand-alone application software.

According to this feature of the present invention, a compact part such as a touch panel can be used in the portable terminal for use of the application software on the host-computer side without using any pointing device such as a mouse or track ball.

As is apparent from the above description, the present invention enables the portable terminal to be made smaller, lighter and less expensive, in which the portable can share data with the host computer such as a personal computer installed in an office or the like. This allows data management to be centralized, and as long as any stand-alone application software is installed in the host computer, it can use the application software freely at any time.

What is claimed is:

1. A computer system comprising:
   a host computer incorporating therein stand-alone application software; and
   a portable terminal coupled to the host computer through a communication medium,
   said host computer including:
      a host-side communication device for communicating with said portable terminal,
      a host-side input device for generating input data to be processed by said application software, said host-side input device being a relative-value input device,
      a host-side output device for providing an output in accordance with output data resulting from the processing by said application software,
      host-side input control means operable to switch between said host-side input device and said host-side communication device for use as an input data source to supply input data to said application software, and
      processing result fetching means, said processing result fetching means fetching the output data resulting from the processing by said application software and sent to said host-side output device and redirecting said output data to said host-side communication device;
   said portable terminal including
      a terminal-side communication device for communicating with said host computer,
      a terminal-side input device for generating input data necessary for processing by said application software, said terminal-side input device being an absolute-value input device,
      a terminal-side output device for providing an output in accordance with output data resulting from the processing by said application software,
      terminal-side input control means for sending the input data, generated by said terminal-side input device, to said terminal-side communication device, said terminal-side input control means converting input data received from said terminal-side input device from an absolute-value to a relative value before being communicated to said host computer, and output reproducing means for reproducing output data from the output received by said terminal-side communication device and sending said reproduced output data to said terminal-side output device, whereby the processing by said stand-alone application software is executed in said host computer in response to the input data transmitted from said portable terminal, and the terminal-side output device outputs a corresponding output in response to the resultant output data returned from said host computer.

2. The computer system according to claim 1, wherein the output data resulting from the processing by said stand-alone application software is screen display data to be written into a video RAM, and said terminal-side output device is an image display device.

3. The computer system according to claim 1, wherein the output data resulting from the processing by said stand-alone application software is print data to be written into a printer buffer, and said terminal-side output device is a printer.

4. The computer system according to claim 1, wherein the output data resulting from the processing by said stand-alone application software is screen display data to be written into a video RAM, the screen display data being compressed before transmission to said portable terminal and expanded after being received by said portable terminal.

5. The computer system according to claim 1, wherein the output data resulting from the processing by said stand-alone application software is print data to be written into a printer buffer, the print data being compressed before transmission to said portable terminal and expanded after being received by said portable terminal.

6. The computer system according to claim 1, wherein said relative-value input device is a mouse.

7. A host computer comprising:
a host-side communication device for communicating with at least one portable terminal;
a host-side input device for generating input data to be processed by stand-alone application software installed in said host computer, said host-side input device being a relative value input device and being different from an input device installed in said at least one portable terminal;
a host-side output device for providing an output in accordance with output data resulting from the processing by said application software;
host-side input control means operable to switch between said host-side input device and said host-side communication device for use as an input data source to supply input data to said application software; and
processing result fetching means, said processing result fetching means fetching the output data resulting from the processing by said application software and sent to said host-side output device and redirecting said output data to said host-side communication device.

8. The host computer according to claim 7, wherein the output data resulting from the processing by said stand-alone application software is screen display data to be written into a video RAM, the screen display data being compressed before transmission to said at least one portable terminal and expanded after being received by said at least one portable terminal.

9. The host computer according to claim 7, wherein the output data resulting from the processing by said stand-alone application software is print data to be written into a printer buffer, the print data being compressed before transmission to said at least one portable terminal and expanded after being received by said at least one portable terminal.

10. A portable terminal comprising:
a terminal-side communication device for communicating with a host computer;
a terminal-side input device for generating input data necessary for processing by stand-alone application software installed in said host computer, said terminal-side input device being an absolute-value input device;
a terminal-side output device for providing an output in accordance with output data resulting from the processing by said application software;
terminal-side input control means for sending the input data, generated by said terminal-side input device, to said terminal-side communication device, said terminal-side input control means converting input data received from said terminal-side input device from an absolute value to a relative value before communicating said input data to said host computer;
output reproducing means for reproducing output data from the output received by said terminal-side communication device and sending said reproduced output data to said terminal-side output device;
and communication means for communicating with said host computer.

11. The portable terminal according to claim 10, wherein the output data resulting from the processing by said stand-alone application software is screen display data to be written into a video RAM, and said terminal-side output device is an image display device.

12. The portable terminal according to claim 10, wherein the output data resulting from the processing by said stand-alone application software is print data to be written into a printer buffer, and said terminal-side output device is a printer.

13. The portable terminal according to claim 10, wherein the output data resulting from the processing by said stand-alone application software is screen display data to be written into a video RAM, the screen display data being compressed before transmission to said portable terminal and expanded after being received by said portable terminal.

14. The portable terminal according to claim 10, wherein the output data resulting from the processing by said stand-alone application software is print data to be written into a printer buffer, the print data being compressed before transmission to said portable terminal and expanded after being received by said portable terminal.

15. A recording medium storing a program, which when executed, allows a computer to execute the steps of:
switching between the host-side input device and a host-side communication device to supply input data to stand-alone application software;
receiving data from a portable terminal which was converted at said portable terminal from an absolute value to a relative value; and
fetching output data resulting from the processing by said stand-alone application software in accordance with said converted input data and sent to a host-side output device; and
sending the output data to a host-side communication device.

16. The recording medium according to claim 15, wherein the output data resulting from the processing by said stand-alone application software is screen display data to be written into a video RAM, the screen display data being compressed before transmission to a portable terminal and expanded after being received by the portable terminal.

17. The recording medium according to claim 15, wherein the output data resulting from the processing by said stand-alone application software is print data to be written into a printer buffer, the print data being compressed before transmission to a portable terminal and expanded after being received by the portable terminal.

18. The computer system according to claim 1, wherein said absolute-value input device is a touch panel.

19. The portable terminal according to claim 10, wherein said absolute-value input device is a touch panel.

20. A computer system comprising:

a host computer incorporating therein stand-alone application software; and a portable terminal coupled to the host computer through a communication medium, said host computer including:

a first central processing unit having a first processing speed and which is capable of performing a first quantity of functions;

a host-side communication device for communicating with said portable terminal, a host-side input device for generating input data to be processed by said application software, a host-side output device for providing an output in accordance with output data resulting from the processing by said application software, host-side input control means operable to switch between said host-side input device and said host-side communication device for use as an input data source to supply input data to said application software, and processing result fetching means, said processing result fetching means fetching the output data resulting from the processing by said application software and sent to said host-side output device and redirecting said output data to said host-side communication device;

said portable terminal including a second central processing unit having a second processing speed and which is capable of performing a second quantity of functions, said second processing speed being slower than said first processing speed and said second quantity of functions being smaller than said first quantity of functions;

a terminal-side communication device for communicating with said host computer, a terminal-side input device for generating input data necessary for processing by said application software, a terminal-side output device for providing an output in accordance with output data resulting from the processing by said application software, terminal-side input control means for sending the input data, generated by said terminal-side input device, to said terminal-side communication device, and output reproducing means for reproducing output data from the output received by said terminal-side communication device and sending said reproduced output data to said terminal-side output device, whereby the processing by said stand-alone application software is executed in said host computer in response to the input data transmitted from said portable terminal, and the terminal-side output device outputs a corresponding output in response to the resultant output data returned from said host computer.

21. A computer system according to claim 20, wherein said terminal-side input device is a relative-value input device, and said host-side input device is an absolute-value input device, said wherein said host-side input control means converts input data received from said portable terminal from an absolute value to a relative value before input to said application software.

22. The computer system according to claim 21, wherein said relative-value input device is a touch panel.

23. The computer system according to claim 20, wherein the output data resulting from the processing by said stand-alone application software is screen display data to be written into a video RAM, and said terminal-side output device is an image display device.

24. The computer system according to claim 20, wherein the output data resulting from the processing by said stand-alone application software is print data to be written into a printer buffer, and said terminal-side output device is a printer.

25. The computer system according to claim 20, wherein the output data resulting from the processing by said stand-alone application software is screen display data to be written into a video RAM, the screen display data being compressed before transmission to said portable terminal and expanded after being received by said portable terminal.

26. The computer system according to claim 20, wherein the output data resulting from the processing by said stand-alone application software is print data to be written into a printer buffer, the print data being compressed before transmission to said portable terminal and expanded after being received by said portable terminal.

* * * * *